United States Patent
Chen et al.

(10) Patent No.: US 7,257,175 B2
(45) Date of Patent: Aug. 14, 2007

(54) METHOD AND APPARATUS FOR PERIODIC SIGNAL DETECTION IN OFDM/DMT SYSTEMS

(75) Inventors: Tsung-Liang Chen, Tainan Hsien (TW); Jen-Wei Liang, Taipei (TW)

(73) Assignee: Afa Technologies, Inc., Hsin-Tien, Taipei Hsien (TW)

( * ) Notice: Subject to any disclaimer, the term of this patent is extended or adjusted under 35 U.S.C. 154(b) by 835 days.

(21) Appl. No.: 10/604,834

(22) Filed: Aug. 20, 2003

(65) Prior Publication Data

US 2005/0041761 A1    Feb. 24, 2005

(51) Int. Cl.
*H04L 27/06* (2006.01)

(52) U.S. Cl. ..................................... 375/343

(58) Field of Classification Search ................. 375/340, 375/342, 343, 260, 222, 245, 364, 365; 370/503, 370/509, 210, 514
See application file for complete search history.

(56) References Cited

U.S. PATENT DOCUMENTS

| | | | |
|---|---|---|---|
| 6,408,696 B1 * | 6/2002 | Jong .......................... | 73/579 |
| 6,618,452 B1 * | 9/2003 | Huber et al. ................ | 375/343 |
| 6,721,355 B1 * | 4/2004 | McClennon et al. ........ | 375/222 |
| 6,735,303 B1 * | 5/2004 | Okuda ................... | 379/406.04 |

* cited by examiner

*Primary Examiner*—Khanh Tran
(74) *Attorney, Agent, or Firm*—Winston Hsu

(57) ABSTRACT

A method for detecting a periodic signal in a communication system. The method includes converting a time domain digitized signal to obtain a corresponding frequency domain digitized signal, quantizing at least two symbols of the frequency domain digitized signal to obtain quantization information, utilizing the quantization information to compute a detection metric for periodic signal detection, and determining that a periodic signal is detected if the detection metric is greater than a predetermined threshold.

9 Claims, 5 Drawing Sheets

| C_PILOT | C_REVERB | C_PILOT | C_ECT | C_REVERB | C_QUIET/ C_PILOT | C_REVERB |

Fig. 5

METHOD AND APPARATUS FOR PERIODIC SIGNAL DETECTION IN OFDM/DMT SYSTEMS

BACKGROUND OF INVENTION

1. Field of the Invention

The present invention relates to periodic signal detection in a system, and more particularly, to periodic signal detection in an OFDM/DMT system.

2. Description of the Prior Art

Signal detection and receiver training are essential tasks for a digital communication system. Without accurate receiver training algorithms, it is not possible to reliably receive the transmitted data. In orthogonal frequency division multiplexing (OFDM) and discrete multi-tone (DMT) communication systems, data is modulated on tones used by the system. Inverse FFT (IFFT) is performed on the modulated tones to obtain a set of time domain samples called OFDM symbol for transmission. DMT is mainly used in continuous transmission systems, such as ADSL and VDSL; while OFDM is used in both continuous and burst transmission systems, such as European digital video broadcast (DVB), 802.11 wireless LANs, and 802.16 fixed wireless systems. OFDM/DMT communication systems use a periodic signal to facilitate signal detection, timing/frequency recovery, and channel estimation at the receiver. A periodic signal contains repeated training symbols, which are designed to possess good time domain and/or frequency domain auto-correlation property. The task of periodic signal detection is to detect arrival of data packets or the beginning of a periodic training signal with high probability of detection and low probability of false alarms under severe frequency selective channel fading and strong interferences.

Most of the existing periodic signal detection methods exploit repeated structures and auto-correlation property of periodic signaling time domain. These methods suffer significant performance degradation when strong narrowband interference (NBI) or Gaussian noise is present. In one approach known in the art, the time domain correlator computes auto-correlation values using current received temporal symbol and previous received temporal symbol until the correlation value exceeds a pre-defined threshold. This method, however, requires a large number of multiplication and addition operations. Time domain correlation is also difficult to establish if the received signal is corrupted by narrowband interference.

Frequency domain methods that correlate tone phases or other information of two consecutive received OFDM symbols achieve excellent periodic signal detection even in the presence of strong narrowband interference. For example, in another approach known in the art, two consecutive received temporal symbols are transformed into frequency domain by FFT operation. Two sets of tone phases are computed for the two frequency domain symbols. Correlation of the two sets of tone phases are computed as a metric for periodic signal detection. The computation requires heavy CPU cycles or complex ASIC implementation that amounts to higher system cost. Also, computation of tone phases adds overhead for communication systems that do not use phase information explicitly.

SUMMARY OF INVENTION

It is therefore a primary objective of the claimed invention to provide a method of periodic signal detection in frequency domain for OFDM/DMT communication systems.

Briefly described, the claimed invention discloses a low complexity and high performance method for periodic signal detection in an orthogonal frequency division multiplexing (OFDM) or a discrete multi-tone (DMT) communication system infrequency domain. The method comprises converting received time domain digitized signals to corresponding frequency domain digitized signals, quantizing at least two symbols in frequency domain to obtain quantization information, and utilizing the quantization information to compute a detection metric for periodic signal detection. A double-detection method based on the detection metric is also described.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 5 is a diagram of the preamble format of ADSL REVERB standard.

DETAILED DESCRIPTION

Figure 1:
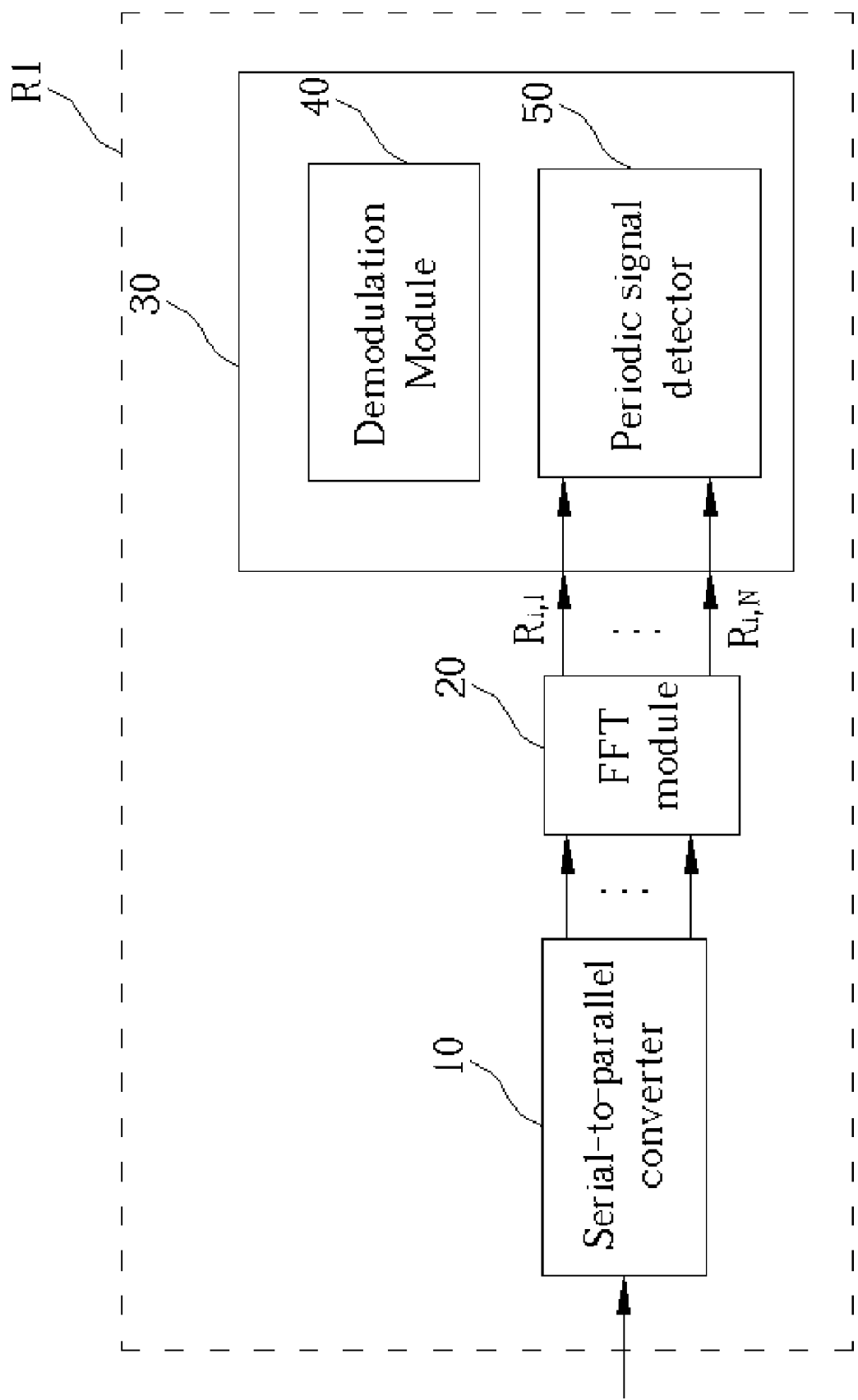
FIG. 1 is a block diagram of an OFDM/DMT receiver according to the present invention.

Please refer to FIG. 1. FIG. 1 is a block diagram of an OFDM/DMT receiver R1 according to the present invention. The serial-to-parallel converter 10 is capable of performing serial-to-parallel conversion on input time domain digitized signals. The fast Fourier transform (FFT) module 20 is electrically connected to the serial-to-parallel converter 10 and transforms the time domain digitized signals to obtain frequency spectrum. The demodulator 30 is electrically connected to the FFT module 20 to perform the demodulation and comprises a demodulation module 40 for demodulating the frequency domain digital signal and a periodic signal detector 50 electrically connected to the FFT module 20. Complex output of the FFT module 20 is denoted as $R_{i,k}$ for the kth tone of the ith received OFDM/DMT symbol. $R_{i,k}$ can be modeled as a weighted version of the transmitted constellation point corrupted by additive noise.

$$R_{i,1} = a_{i,1} + b_{i,1} \cdot j = X_{i,1} \cdot H_{i,1} + N_{i,1}, \ k=1, \ldots, N.$$

k: Tone index.
i: Received OFDM symbol index.
$R_{i,k}$: Received constellation point for tone k.
$a_{i,k}$: the real part of $R_{i,k}$.
$b_{i,k}$: the imaginary part of $R_{i,k}$.
$X_{i,k}$: Transmitted constellation point for tone k.
$H_{i,k}$: Channel attenuation for tone k.
$N_{i,k}$: Noise for tone k.
$R_{i,k}$ represents a constellation point on the complex plane for tone k of the ith received OFDM symbol. In this invention, constellation points $\{R_{i,1}, R_{i,2}, \ldots, R_{i,N}\}$ and $\{R_{i+1,1}, R_{i+1,2}, \ldots, R_{i+1,N}\}$ of two consecutive received OFDM/DMT symbols are used to compute a detection metric $D_{i,i+1}$ as follows:

$$D_{i,i+1} = \sum_{k=1}^{N} [w(a_{i,k}) \cdot \text{sign}(a_{i,k})] \cdot [w(a_{i+1,k}) \cdot \text{sign}(a_{i+1,k})] +$$

$$\sum_{k=1}^{N} [w(b_{i,k}) \cdot \text{sign}(b_{i,k})] \cdot [w(b_{i+1,k}) \cdot \text{sign}(b_{i+1,k})]$$

$$= \sum_{k=1}^{N} Q(a_{i,k}) \cdot Q(a_{i+1,k}) + \sum_{k=1}^{N} Q(b_{i,k}) \cdot Q(b_{i+1,k})$$

Where $\text{sign}(x)$ is a sign extraction function:

$$\text{sign}(x) = \begin{cases} -1, & \text{if } x < 0. \\ 0, & \text{if } x = 0. \\ 1, & \text{if } x > 0. \end{cases}$$

$w(x)$ is a measure of reliability of $\text{sign}(x)$ $$w(x) = \begin{cases} 0, & \text{if } |x| < \text{Threshold} \\ 1, & \text{otherwise.} \end{cases}$$

$Q(x)$ is a quantizer that combines $w(x)$ and $\text{sign}(x)$ $$Q(x) = \begin{cases} -1, & \text{if } x < -\text{Threshold} \\ 1, & \text{if } x > \text{Threshold} \\ 0, & \text{otherwise.} \end{cases}$$

In words this detection metric is the sum of the weighted sign correlations of the real part and the imaginary part of the constellation points $\{R_{i,1}, R_{i,2}, \ldots, R_{i,N}\}$ and $\{R_{i+1,1}, R_{i+1,2}, \ldots, R_{i+1,N}\}$.

The periodic signal detection criterion is that a periodic signal is detected if $D_{i,i+1}$ is greater than a positive threshold.

In some burst OFDM systems, the last periodic signal is sign-inverted to signal end of periodic signal (EOP). The same detection metric can be used for the EOP detection. Here the EOP detection criterion is that EOP is detected if $D_{i,i+1}$ is smaller than a negative threshold.

Figure 2:
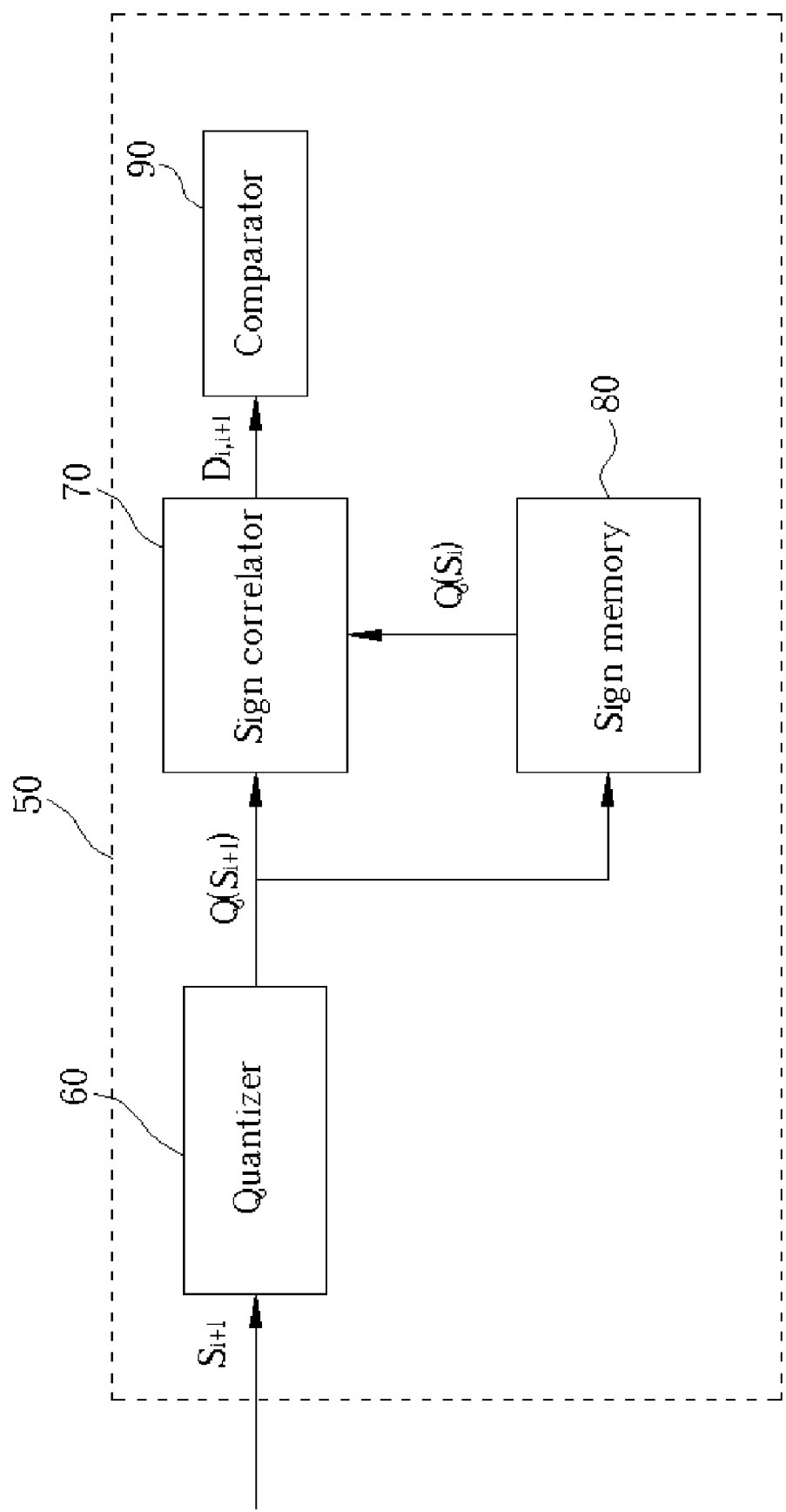
FIG. 2 is a block diagram of the periodic signal detector in FIG. 1.

Please refer to FIG. 2. FIG. 2 is a block diagram of the periodic signal detector 50 in FIG. 1. The periodic signal detector 50 comprises a quantizer 60 for quantizing input signals. A sign correlator 70 is electrically connected to the quantizer 60 for performing a predetermined correlation to generate a detection metric for periodic signal detection. And a sign memory 80 is electrically connected to the quantizer 60 and the sign correlator 70 for providing to the sign correlator 70 the stored sign information of the previous symbol obtained from the quantizer 60.

$S_{i+1}$ is the collection of the real part and imaginary part signs of the (i+1)th received OFDM/DMT symbol. The quantizer output $Q(S_{i+1})$ is the set of weighted signs. This implementation realizes the method of periodic signal detection of this invention described in the paragraph above. In this manner, the memory required is minimal since only signs of FFT output are stored.

Figure 3:
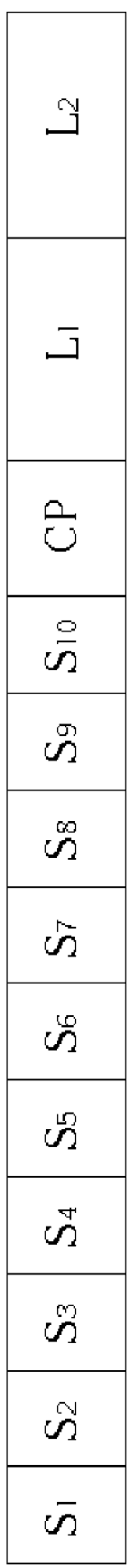
FIG. 3 is a diagram of the preamble format of IEEE 802.11a standard.

Please refer to FIG. 3. FIG. 3 is a diagram of the preamble format of IEEE 802.11a standard. S1 to S10 are identical short periodic symbols each having 16 samples. CP is a 32-sample cyclic prefix that protects the long periodic symbols L1 and L2 from inter-symbol interference (ISI) caused by the short periodic symbols S1 to S10. L1 and L2 are identical OFDM symbols each having 64 samples. The method and the system of periodic signal detection in the present invention can be applied to both the short and the long periodic symbols in IEEE 802.11a standard to implement preamble detection.

HomePlug is a network system utilizing the medium of existing power line wiring in homes and offices for the infrastructure of computer network The HomePlug power line communications system is based on a burst-OFDM scheme for exchanging packetized information, and utilizes preambles for receiver training. The preambles of Home-Plug system are very similar to that of IEEE 802.11a. The identity of the repeated symbols guarantees the applicability of the method of periodical symbol detection in this present invention.

For a periodic signal that contains at least three periodic symbols, like the preamble in IEEE 802.11a standard and many other systems, two consecutive detections and two thresholds are used for detecting the periodic signal. The periodic signal is detected if $D_{i,i+1}$ is greater than a threshold T1 and $D_{i+1,i+2}$ is greater than another threshold T2, where threshold T1 is smaller than or equal to threshold T2. The first periodic signal detection D1, uses a lower threshold T1 to determine whether the periodic signal is possibly detected. The second periodic signal detection D2, uses a higher threshold T2 to determine whether the periodic signal is really detected and to reject false alarms.

Figure 4:
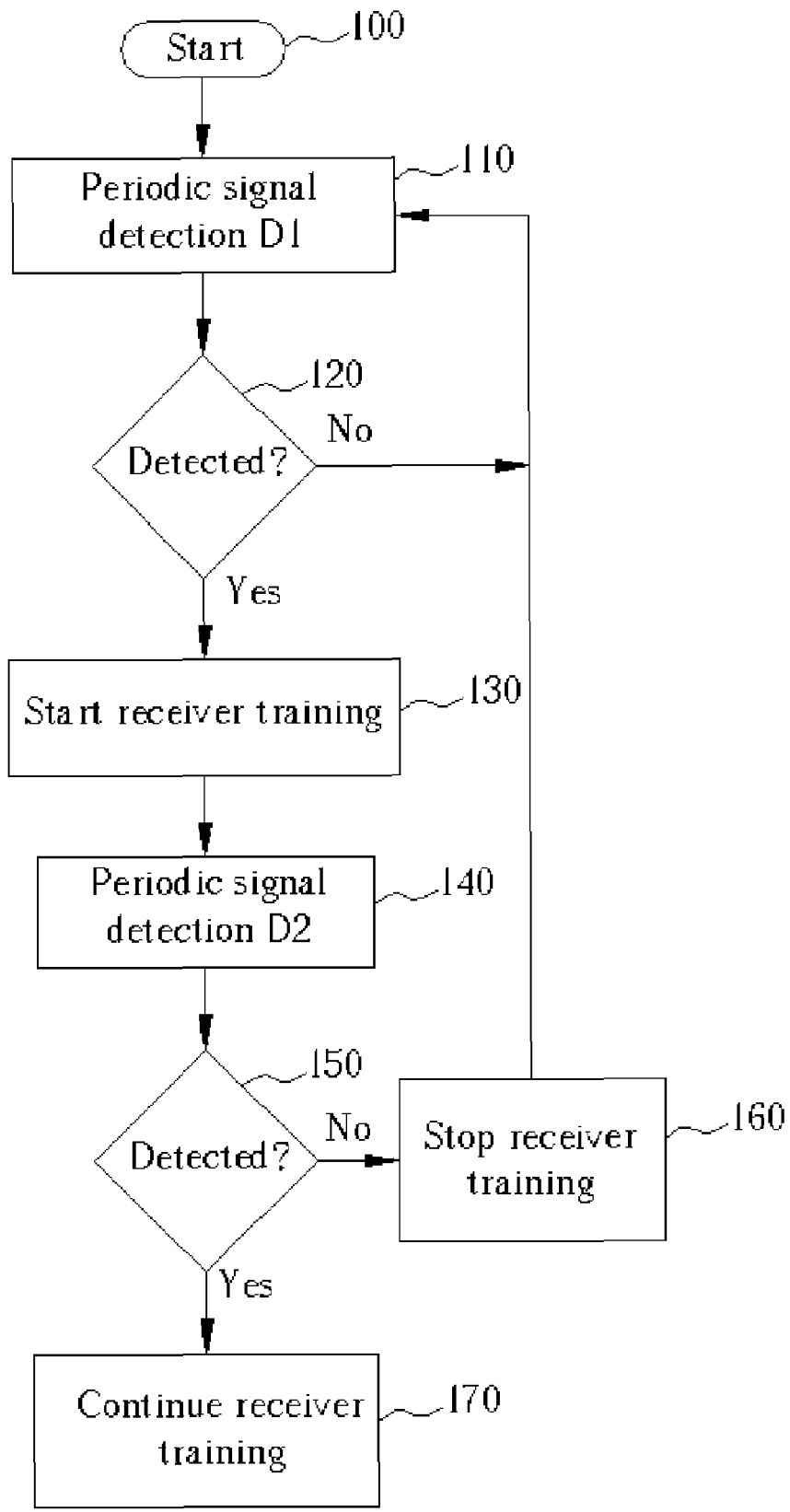
FIG. 4 is a flow chart of double periodic signal detection and receiver training according to the present invention.

Please refer to FIG. 4. FIG. 4 is a flow chart of double periodic signal detection and receiver training according to the present invention.

Step 100: Start double periodic signal detection;

Step 110: Perform periodic signal detection D1 on first two of three consecutive symbols;

Step 120: Check if the periodic signal detection D1 succeeds; if so, go to step 130; if not, go to step 110;

Step 130: Start receiver training;

Step 140: Perform periodic signal detection D2 on last two of the three consecutive symbols;

Step 150: Check if the periodic signal detection D2 succeeds; if so, go to step 170; if not, go to step 160;

Step 160: Stop the receiver training and go to step 110;

Step 170: Determine the periodic signal being detected, and continue the receiver training.

A typical receiver training includes timing/frequency recovery, channel estimation, and/or other functions. In FIG. 5, the receiver training is started when periodic signal detection D1 is successful. However, the receiver training can be started even before periodic signal detection D1 is successful. That is, the receiver training can be performed concurrently with the periodic signal detection D1.

There are three possible operating scenarios as described below. For the first scenario, the first periodic signal detection D1 keeps failing so the first periodic signal detection D1 is performed repeatedly as each FFT output is available. In the second scenario, the first periodic signal detection D1 succeeds, but the second periodic signal detection D2 fails. The preamble processing is started after the first periodic signal detection D1 and stopped after the second periodic signal detection D2. The first periodic signal detection D1 is performed after the second periodic signal detection D2. The last possible scenario is both the first periodic signal detection D1 and the second periodic signal detection D2 succeed. The receiver training is started after the first periodic signal detection D1 and continued beyond the second periodic signal detection D2.

Please refer to FIG. 5. FIG. 5 is a diagram of the preamble format of REVERB in asymmetric digital subscriber line (ADSL) standard. The REVERB signal is adapted to allow the ADSL receiver to adjust its automatic gain control, to perform synchronization and to train the receiver equalizer. The REVERB signal is denoted as C_REVERB in FIG. 5 and is used for three times in the ATU-C training sequence. The three REVERB signals contain 512, 1536, and 1024 repeated training symbols respectively. Since there are more than three symbols in each REVERB signal, the claimed double periodic signal detection can be used to detect arrival of the REVERB signal for ADSL system.

The present invention discloses a low complexity and high performance method for periodic signal detection in both continuous and burst transmission OFDM or DMT communication systems in frequency domain. In this invention, the memory required is minimal since only signs of FFT output are stored. It is also provided in the present invention a double detecting method for periodic signal that contains at least three periodic symbols. In this double detecting method, two consecutive detections and two thresholds are used for detecting periodic signals. In this manner the false alarm of periodic signal detection is avoided and the receiver training can be started before the periodic signal detection is confirmed. The embodiments of the basic detection metric and the double detecting method are also provided.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for detecting a periodic signal in a communication system, the method comprising:
   (a) converting a time domain digitized signal to obtain a corresponding frequency domain digitized signal;
   (b) quantizing at least two symbols of the frequency domain digitized signal to obtain quantization information; and
   (c) utilizing the quantization information to compute a detection metric for periodic signal detection.

2. The method of claim 1 wherein computing the detection metric comprises utilizing a sum of weighted sign correlations of real parts and imaginary parts of the quantization information.

3. The method of claim 1 further comprising determining that a periodic signal is detected if the detection metric is greater than a predetermined threshold.

4. The method of claim 1 wherein the symbols are consecutive symbols.

5. The method of claim 4 wherein computing the detection metric comprises utilizing a sum of weighted sign correlations of real parts and imaginary parts of the first two of three consecutive symbols in the quantization information as a first detection metric, and utilizing real parts and imaginary parts of the last two of the three consecutive symbols in the quantization information as a second detection metric; wherein the periodic signal is determined to be detected if the first detection metric is greater than a first positive threshold and the second detection metric is greater than a second positive threshold, the first positive threshold being smaller than or equal to the second positive threshold.

6. The method in claim 5 further comprising:
   (a) determining that the periodic signal is not detected when the first detection metric is not greater than the first positive threshold;
   (b) determining that the periodic signal is possibly detected when the first detection metric is greater than the first positive threshold and the second detection metric is not yet computed;
   (c) determining that the periodic signal is not detected when the first detection metric is greater than the first positive threshold and the second detection metric is not greater than the second positive threshold;
   (d) initiating computing of another first detection metric when the periodic signal is determined to be not detected; and
   (e) performing receiver training when the periodic signal is determined to be detected or possibly detected, and halting receiver training when the periodic signal is determined to be not detected.

7. A periodic signal detection system for an orthogonal frequency division multiplexing (OFDM) or a discrete multi-tone (DMT) communication system, the signal detection system comprising:
   a serial-to-parallel converter capable of performing serial-to-parallel conversion on an input time domain digital signal;
   a fast Fourier transform (FFT) module electrically connected to the serial-to-parallel converter for transforming the time domain digital signal to a frequency domain digital signal; and
   a demodulator electrically connected to the FFT module comprising:
   a periodic signal detector comprising:
   a quantizer electrically connected to the FFT module for quantizing symbols of the frequency domain digital signal of the FFT module;
   a sign correlator electrically connected to the quantizer for performing a predetermined correlation to generate a detection metric for periodic signal detection; and
   a sign memory electrically connected to the quantizer and the sign correlator for providing sign information obtained from the quantizer to the sign correlator; and
   a demodulation module for demodulating the frequency domain digital signal.

8. The periodic signal detection system of claim 7 further comprising a comparator for comparing the detection metric with at least one predetermined threshold.

9. The periodic signal detection system in claim 7 wherein the signal correlator is capable of generating a sum of weighted sign correlations of real parts and imaginary parts of two consecutive outputs of the quantizer to provide the detection metric for periodic signal detection.

* * * * *